US010224656B2

(12) United States Patent
Maranville (10) Patent No.: US 10,224,656 B2
(45) Date of Patent: Mar. 5, 2019

(54) ELECTRICAL CONNECTOR FOR A REMOVABLE TAILGATE (71) Applicant: Ford Global technologies, LLC, Dearborn, MI (US)

(72) Inventor: Clay Wesley Maranville, Ypsilanti, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 15/917,533

(22) Filed: Mar. 9, 2018

(65) Prior Publication Data
US 2018/0212351 A1 Jul. 26, 2018

Related U.S. Application Data (63) Continuation of application No. 15/412,569, filed on Jan. 23, 2017, now Pat. No. 9,923,294.

(51) Int. Cl.
H01R 13/08 (2006.01)
B60R 16/02 (2006.01)
B62D 33/023 (2006.01)
B62D 33/027 (2006.01)
B62D 33/033 (2006.01)
B60R 16/027 (2006.01)

(52) U.S. Cl.
CPC ............ H01R 13/08 (2013.01); B60R 16/02 (2013.01); B60R 16/027 (2013.01); B62D 33/023 (2013.01); B62D 33/0273 (2013.01); B62D 33/033 (2013.01); H01R 2201/26 (2013.01)

(58) Field of Classification Search
CPC .... H01R 13/08; H01R 2201/26; B60R 16/02; B60R 16/027

USPC .......................................................... 439/34
See application file for complete search history.

(56) References Cited

U.S. PATENT DOCUMENTS 3,643,207 A * 2/1972 Cairns .................. H01R 13/523
439/201
3,879,103 A 4/1975 Peltola
3,972,581 A * 8/1976 Oldham ............... H01R 13/523
439/201

(Continued)

FOREIGN PATENT DOCUMENTS

EP 0124987 A2 11/1984
EP 1222484 A2 7/2002

(Continued)

OTHER PUBLICATIONS

Search Report dated Jul. 3, 2018 for GB Patent Application No. GB 1800941.5 (4 pages).

Primary Examiner — Alexander Gilman
(74) Attorney, Agent, or Firm — James P. Muraff; Neal, Gerber & Eisenberg LLP (57) ABSTRACT Systems and apparatus are disclosed for an electrical connector for a removable tailgate. An example connector for a vehicle tailgate includes a body, a hyperboloid socket and dielectric oil. The example body defines a chamber and a split line extending from the chamber. The split line facilitates penetration of a hyperboloid pin into the chamber. The example hyperboloid socket is disposed in the chamber and aligned with the split line. The example dielectric oil partially fills the chamber to coat the hyperboloid pin to provide corrosion resistance for the hyperboloid pin.

17 Claims, 8 Drawing Sheets

(56) References Cited

U.S. PATENT DOCUMENTS

| | | | | |
|---|---|---|---|---|
| 4,085,993 A * | 4/1978 | Cairns | H01R 13/523 | 439/201 |
| 4,373,767 A * | 2/1983 | Cairns | H01R 13/523 | 439/199 |
| 4,411,491 A * | 10/1983 | Larkin | H01R 13/523 | 385/59 |
| 4,431,256 A | 2/1984 | Piscitelli | | |
| 4,606,603 A * | 8/1986 | Cairns | G02B 6/3816 | 174/70 R |
| 4,662,699 A | 5/1987 | Vachhani | | |
| 4,795,359 A | 1/1989 | Alcock | | |
| 4,861,088 A | 8/1989 | Fedrigo | | |
| 4,887,883 A * | 12/1989 | Darbut | G02B 6/3816 | 385/58 |
| 4,941,258 A | 7/1990 | Wright | | |
| 4,948,377 A * | 8/1990 | Cairns | H01R 13/523 | 439/200 |
| 4,998,894 A * | 3/1991 | Gronvall | G02B 6/4447 | 439/133 |
| 5,125,056 A * | 6/1992 | Hughes | G02B 6/3816 | 385/59 |
| 5,173,573 A | 12/1992 | Jervis | | |
| 5,194,012 A * | 3/1993 | Cairns | H01R 13/523 | 439/201 |
| 5,357,057 A | 10/1994 | Debbaut | | |
| 5,371,323 A | 12/1994 | Schneider | | |
| 5,397,859 A * | 3/1995 | Robertson | H01R 4/70 | 174/84 R |
| 5,569,882 A * | 10/1996 | Yokoyama | H02G 15/003 | 174/138 F |
| 5,594,210 A * | 1/1997 | Yabe | H01R 4/70 | 174/76 |
| 5,606,149 A * | 2/1997 | Yaworski | H02G 15/103 | 174/84 R |
| 5,645,442 A * | 7/1997 | Cairns | H01R 13/523 | 439/201 |
| 5,684,274 A | 11/1997 | McLeod | | |
| 5,685,727 A * | 11/1997 | Cairns | G02B 6/3816 | 385/56 |
| 6,169,250 B1 * | 1/2001 | Bolcato | H02G 15/10 | 174/92 |
| 6,854,781 B2 * | 2/2005 | Roach | B62D 33/0273 | 296/50 |
| 6,910,910 B2 * | 6/2005 | Cairns | G02B 6/3816 | 174/13 |
| 7,246,847 B2 * | 7/2007 | Polewarczyk | B60J 5/00 | 296/190.11 |
| 7,423,224 B2 | 9/2008 | Puhl | | |
| 7,533,920 B2 | 5/2009 | Ohly | | |
| 7,625,031 B2 | 12/2009 | Ohly | | |
| 7,654,600 B2 | 2/2010 | Stratten | | |
| 7,673,929 B2 * | 3/2010 | Patzer | E05F 5/00 | 296/146.11 |
| 7,875,803 B2 | 1/2011 | Sjoberg | | |
| 7,955,105 B2 * | 6/2011 | Maeland | H01R 13/523 | 439/191 |
| 8,178,783 B2 * | 5/2012 | Yaworski | H02G 15/113 | 174/92 |
| 8,227,696 B2 * | 7/2012 | Pullium, III | H01R 4/70 | 174/92 |
| 9,263,824 B2 * | 2/2016 | Cairns | H01R 24/38 | |
| 9,923,294 B1 * | 3/2018 | Maranville | B60R 16/02 | |
| 2008/0100085 A1 | 5/2008 | Ohly | | |
| 2011/0128102 A1 | 6/2011 | Pfeiffer | | |
| 2015/0111420 A1 * | 4/2015 | Zillinger | E21B 43/123 | 439/521 |
| 2015/0315837 A1 | 11/2015 | Salmon | | |

FOREIGN PATENT DOCUMENTS

| | | |
|---|---|---|
| EP | 1222484 B1 | 6/2004 |
| WO | WO 2015179043 A1 | 11/2015 |

\* cited by examiner

ELECTRICAL CONNECTOR FOR A REMOVABLE TAILGATE

CROSS-REFERENCE TO RELATED APPLICATIONS

This application is a continuation of U.S. patent application Ser. No. 15/412,569 filed Jan. 23, 2017, which will issue as U.S. Pat. No. 9,923,294 on Mar. 20, 2018, which is herein incorporated by reference in its entirety.

TECHNICAL FIELD

The present disclosure generally relates to tailgates on vehicles and, more specifically, an electrical connector for a removable tailgate.

BACKGROUND

Increasingly, vehicles are being manufactured with sensors, such as cameras and ultrasonic sensors, installed in various places on the vehicle. Some parts of the vehicle, such as doors, tailgates, and liftgates, have hinged connections to the vehicle that increases the difficulty of supplying power to components installed on those parts, such as sensors and cameras. In particular, tailgates are designed to be readily removable, increasing the defaulting supplying power to sensors installed in the tailgate.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are disclosed for an electrical connector for a removable tailgate. An example connector for a vehicle tailgate includes a body, a hyperboloid socket and dielectric oil. The example body defines a chamber and a split line extending from the chamber. The split line facilitates penetration of a hyperboloid pin into the chamber. The example hyperboloid socket is disposed in the chamber and aligned with the split line. The example dielectric oil partially fills the chamber to coat the hyperboloid pin to provide corrosion resistance for the hyperboloid pin.

An example bushing for a tailgate connector includes first and second caps, a cylindrical body, and dielectric oil. The example cylindrical body is between the first and second caps. Additionally, the example body defines a chamber and a split line. The split line extends from the first cap to the second cap through the chamber to facilitate penetration of a hyperboloid pin through the bushing. Additionally, the dielectric oil partially fills the chamber to coat the hyperboloid pin to provide corrosion resistance for the hyperboloid pin.

A connecting assembly includes a first connector, busing, and a second connector. The example first connector includes a first body, a hyperboloid socket, and first dielectric oil. The first body defines a first chamber and a first split line extending from the chamber. The hyperboloid socket is aligned with the first split line. The first dielectric oil partially fills the first chamber. The example bushing includes a second body and second dielectric oil. The second body defines a second chamber and a second split line through the second body and the second chamber. The second dielectric oil partially fills the second chamber. The example second connector includes a hyperboloid pin. When the second connector is engaged with the bushing and the first connector, the hyperboloid pin (a) penetrates the bushing through the second split line, (b) penetrates into the first chamber through the first split line, and (c) engages the hyperboloid socket to provide an electrical connection between a tailgate and a vehicle. During the engagement, the hyperboloid pin is coated by the first and second dielectric oil.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Vehicles, such as trucks, include a body and a movable tailgate. The tailgate rotates about an axis to open and close. Additionally, the tailgates are removable. The removable tailgates can be detached and reattached to the vehicle a repeated number of times. The vehicles include electrical connections between the body of the vehicle and the tailgate to provide power to electrical features (e.g., sensors, power outlets, etc.) installed in the tailgate. For example, the tailgate may include a rear view camera. Most often, a pigtail connection from the body of the vehicle is used to provide the electrical connection. However, because the pigtail connection is thin and flexible, the pigtail connection experiences mechanical wear over time from repeatedly opening and closing of the tailgate, as well as detaching and reattaching the tailgate from or to the body of the vehicle. Such movement of the tailgate introduces mechanical wear on the pigtail connection overtime. This wear causes the electrical connection to degrade and eventually provide no power to the electrical features installed in the tailgate. Additionally, the pigtail connection experiences corrosion due to exposure to corrosion initiators, such as dirt, salt, etc. This corrosion also worsens the electrical connection.

As disclosed below, an electrical connecting assembly provides an electrical connection between the body of the vehicle and the tailgate of the vehicle at the pivot point of the tailgate. The electrical connecting assembly is formed when the tailgate is attached to the body of the vehicle; and is broken when the tailgate is detached from the body of the vehicle. The electrical connecting assembly of provides power from the power bus of the vehicle to the tailgate. Additionally, the electrical connecting assembly includes dielectric oil to provide corrosion resistance and deter deterioration due to mechanical wear. The electrical connecting assembly includes a socket connector, (b) a bushing; and (c) a pin connector. The socket connector includes a hyperboloid socket and dielectric oil. The bushing defines a chamber with dielectric oil. The pin connector includes a hyperboloid pin and a plunger assembly to protect the hyperboloid pin when the tailgate is not connected to the vehicle. When the electrical connecting assembly is engaged, the hyperboloid pin (a) penetrates the bushing via a split line defined through the bushing and is coated by dielectric oil, (b) penetrates into the body of the socket connector via a split line define through the front face of the socket connector and is coated by dielectric oil, and (c) engages the hyperboloid socket.

The socket connector is partially disposed within the body of the vehicle and partially disposed within an inner pivot body of a body hinge mounted to the body of the vehicle. The front surface (sometimes referred to as the "connection surface") of the socket connector is exposed though the inner pivot body of the body hinge. The bushing is removably inserted into the inner pivot body of the hinge so that the split line defined through the front surface of the socket connector is coaxial with the split line defined through the bushing. The pin connector is partially disposed within the tailgate and is partially disposed within an outer pivot body of a tailgate hinge mounted to the tailgate. The front surface of the pin connector is exposed though the outer pivot body of the tailgate hinge. Then the tailgate is connected to the body of the vehicle, the outer pivot body of the tailgate hinge fits over the inner pivot body of the body hinge to facilitate rotation of the outer pivot body about the inner pivot body. In some examples, to further facilitate rotation, the vehicle includes an intermediate pivot body between the inner pivot body and the outer pivot body.

Figure 1:
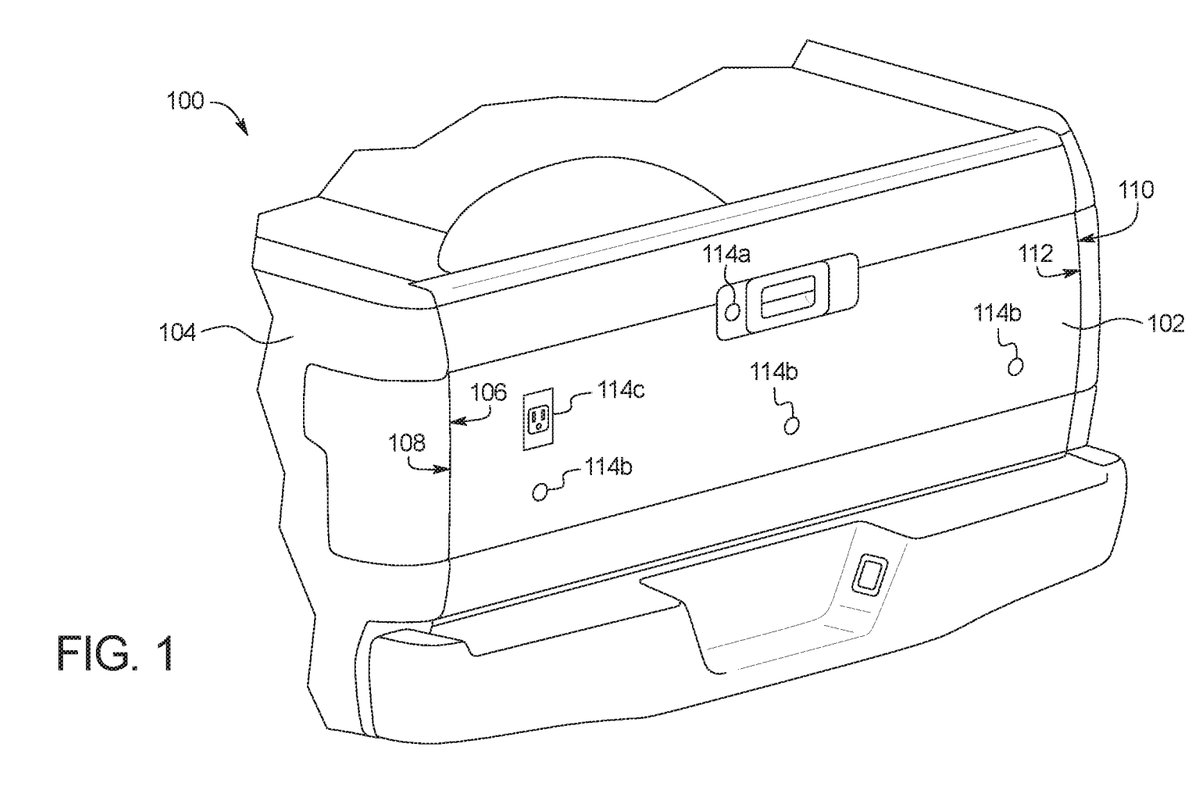
FIG. 1 illustrates a vehicle with a tailgate.

FIG. 1 illustrates a vehicle 100 with a tailgate 102. The vehicle 100 may be any vehicle with a tailgate and/or a liftgate. The term "tailgate" is used throughout below. However, the electrical connecting assembly as disclosed below may also be used to provide power to a liftgate. The vehicle 100 may be a standard gasoline powered vehicle, a hybrid vehicle, an electric vehicle, a fuel cell vehicle, and/or any other mobility implement type of vehicle. The vehicle 100 includes parts related to mobility, such as a powertrain with an engine, a transmission, a suspension, a driveshaft, and/or wheels, etc. The vehicle 100 may be non-autonomous, semi-autonomous (e.g., some routine motive functions controlled by the vehicle 100), or autonomous (e.g., motive functions are controlled by the vehicle 100 without direct driver input). In this illustrated example, the vehicle 100 includes a body 104.

As used herein, terms the "driver side body surface"; "driver side tailgate surface"; passenger side body surface"; and "passenger side tailgate surface" refer to describe various locations of the body 104 and the tailgate 102 of the vehicle 100. More specifically, the driver side body surface 106 refers to the inner surface of the body 104 on the side of the vehicle 100 associated with the driver's seat. The driver side tailgate surface 108 refers to the outer surface of the tailgate 102 on the side of the vehicle 100 associated with the driver's seat. The passenger side body surface 110 refers to the inner surface of the body 104 on the side of the vehicle 100 associated with the passenger's seat. The passenger side tailgate surface 112 refers to the outer surface of the tailgate 102 on the side of the vehicle 100 associated with the passenger's seat.

In the illustrated example, the tailgate 102 includes features that use electrical power to operate. In the illustrated example, the tailgate 102 includes a rear-view camera 114a, sensors 114b (e.g., ultrasonic sensors, RADAR, infrared sensors, etc.), and an electrical outlet 114c. As described below, the tailgate 102 pivots around hinge joints formed by the body 104 and the tailgate 102. Additionally, the tailgate 102 is removable from the vehicle 100.

Figure 2:
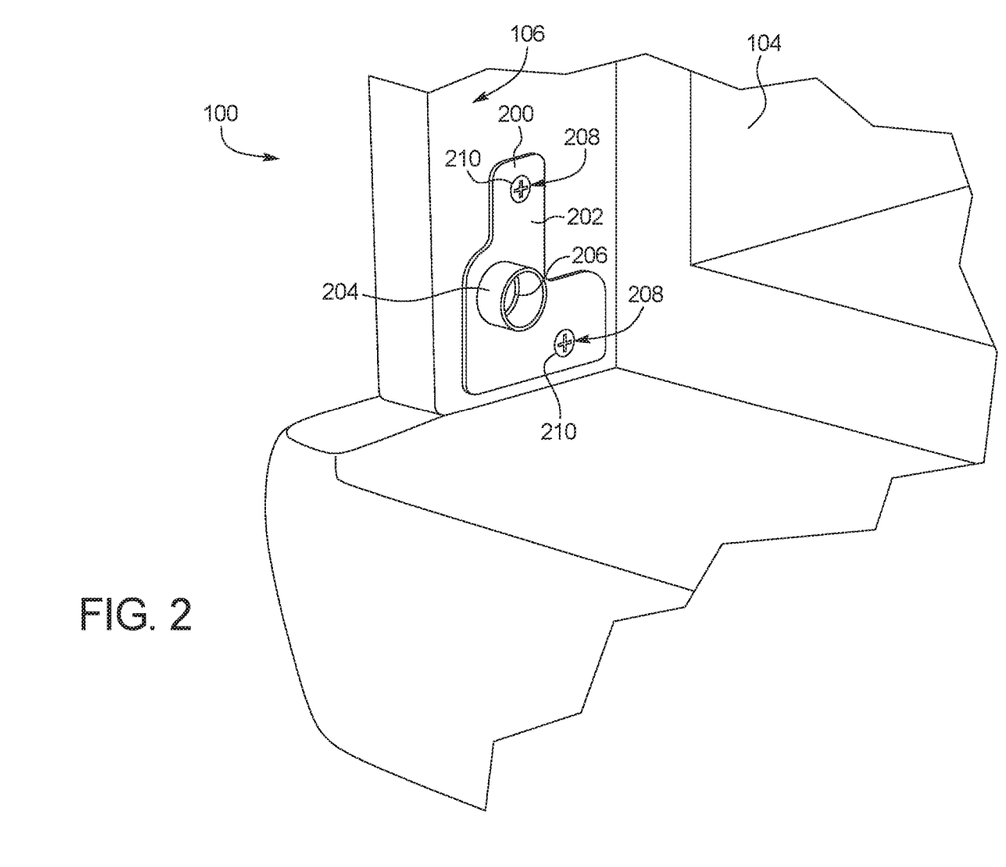
FIG. 2 illustrates a hinge on a body of the vehicle.

FIG. 2 illustrates a hinge 200 on a body 104 of the vehicle 100. In the illustrated example, the hinge 200 is attached to the driver side body surface 106 of the vehicle 100. The example hinge 200 includes a base plate 202 and an inner pivot body 204 extending from the base plate 202. the base plate defines a connector hole 206 which aligns with a matching connector hole (not shown) defined by the body 104 on the driver side body surface 106 of the vehicle 100. The base plate defines locating holes 208 that align with corresponding mating holes (not shown) defined by the body 104 on the driver side body surface 106 of the vehicle 100 to facilitate securing the hinge 200 to the body 104 of the vehicle 100. In the illustrated example, locating fasteners 210 secure the hinge 200 to the body 104 of the vehicle 100 via the locating holes 208 and the mating holes defined by the body 104. The inner pivot body 204 is configured to receive a first end of a socket connector (e.g., the socket connector 400 of FIGS. 4 and 5 below). As disclosed below, the first end of the socket connector includes a connection surface that is accessible through the inner pivot body 204.

Figure 3:
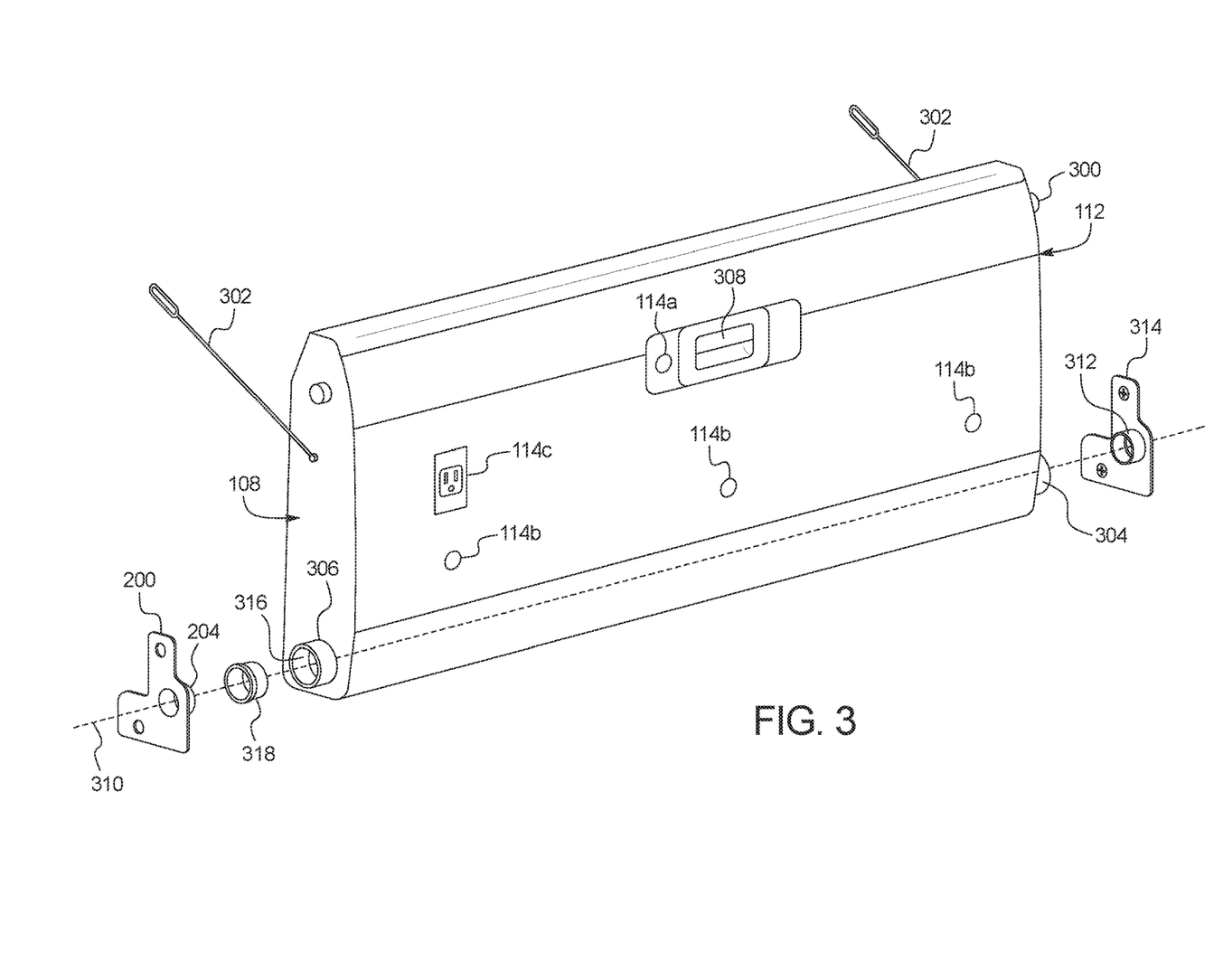
FIG. 3 illustrates the tailgate of FIG. 1.

FIG. 3 illustrates the tailgate 102 of FIG. 1. In the illustrated example, the tailgate 102 includes latches 300, tailgate limit straps 302, a mounting cup 304, and an outer pivot body 306. The latches 300 are mechanically and/or electronically coupled to a tailgate release handle 308. When the tailgate 102 is shut, the latches 300 engage with corresponding slots (not shown) on the body 104 of the vehicle 100. When used, the tailgate release handle 308 causes the latches 300 to retreat into the tailgate 102 to release the tailgate 102 and allow the tailgate 102 to be rotated about a tailgate rotational axis 310. The tailgate limit straps 302 are attached to the tailgate 102 and are removably attached to the body 104 of the vehicle 100. The tailgate limit straps 302, when attached to the body 104 of the vehicle 100, limit the range of rotation of the tailgate 102 about the tailgate rotational axis 310.

The mounting cup 304 is extends from the passenger side tailgate surface 112 of the tailgate 102. The mounting cup 304 engages with a mounting peg 312 via a slot (not shown) defined by the mounting cup 304. In the illustrated example, the mounting peg 312 is attached to a base plate 314 that is affixed to the passenger side body surface 110 of the vehicle 100. When the tailgate 102 is attached, the mounting cup 304 rotates about mounting peg 312. When the tailgate 102 is rotates at an angle so that the slot of the mounting cup 304 aligns with the mounting peg 312, the mounting cup 304 is removable from the mounting peg 312 to facilitate removing the tailgate 102 from the vehicle 100. To attach the tailgate 102 to the vehicle 100, the slot of the mounting cup 304 is aligned with the mounting peg 312 and engaged with the mounting peg 312.

The outer pivot body 306 extends from the driver side tailgate surface 108 of the tailgate 102. The outer pivot body 306 defines a hole 316 that is coaxial with a hole (not shown) defined by the tailgate 102 on the driver side tailgate surface 108. As disclosed below, the outer pivot body 306 receives a first end of a pin connector (e.g., the pin connector 404 of FIGS. 4 and 7 below) through the hole 316 from the tailgate 102. In the illustrated example, when the tailgate 102 is attached to the vehicle 100, the inner pivot body 204 attached to the body 104 of the vehicle 100 fits within an intermediate pivot body 318, which fits within the outer pivot body 306 of the tailgate 102. The inner pivot body 204, the intermediate pivot body 318 and the outer pivot body 306 are coaxial with the tailgate rotational axis 310. The intermediate pivot body 318 facilitates rotation of the outer pivot body 306 about the inner pivot body 204.

Figure 4:
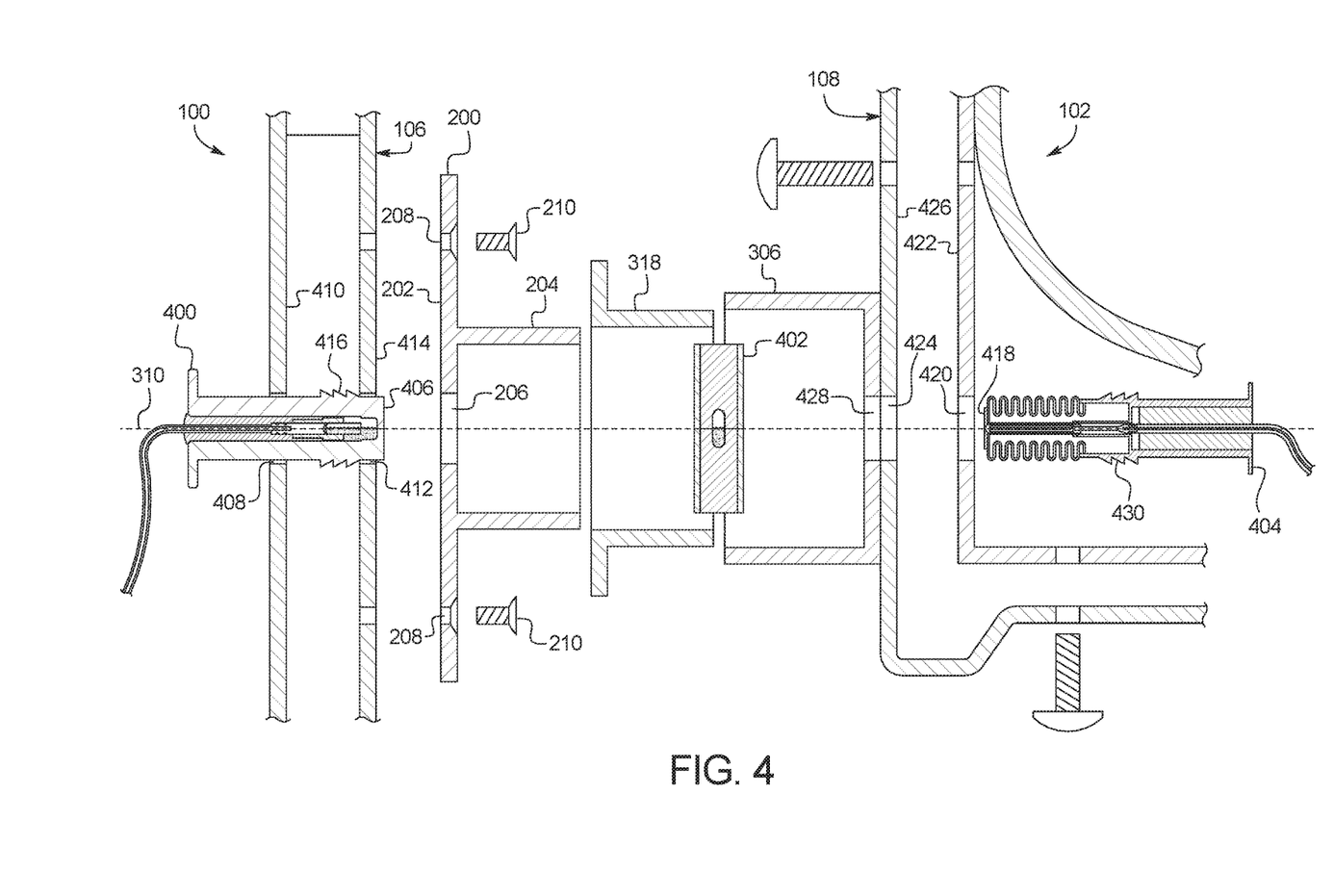
FIG. 4 illustrates an exploded cross-section of the vehicle and the tailgate.

FIG. 4 illustrates an exploded cross-section of the vehicle 100 and the tailgate 102. In the illustrated example, a socket connector 400, a bushing 402, and a pin connector 404 are aligned along the tailgate rotational axis 310. The socket connector 400 is disclosed in more detail in FIG. 5 below. The bushing 402 is disclosed in more detail in FIG. 6 below. The pin connector 404 is disclosed in more detail in FIG. 7 below.

In the illustrated example, a first end 406 of the socket connector 400 fits into the a hole 408 defined in the inner skin 410 of the body 104, through a hole 412 defined in the outer skin 414 of the body 104, and into the connector hole 206 of the hinge 200. In the illustrated example, the socket connector 400 is retained in place by retention clips 416 that, under normal use, only allow the first end 406 of the socket connector 400 to pass through the holes 206, 408, and 412 one way.

In the illustrated example, a first end 418 of the pin connector 404 fits into the a hole 420 defined in the inner skin 422 of the tailgate 102, through a hole 424 defined in the outer skin 426 of the tailgate 102, and into a connector hole 428 defined by the of the outer pivot body 306. In the illustrated example, the pin connector 404 is retained in place by retention clips 430 that, under normal use, only allow the first end 418 of the pin connector 404 to pass through the holes 420, 424, and 428 one way.

Figure 5:
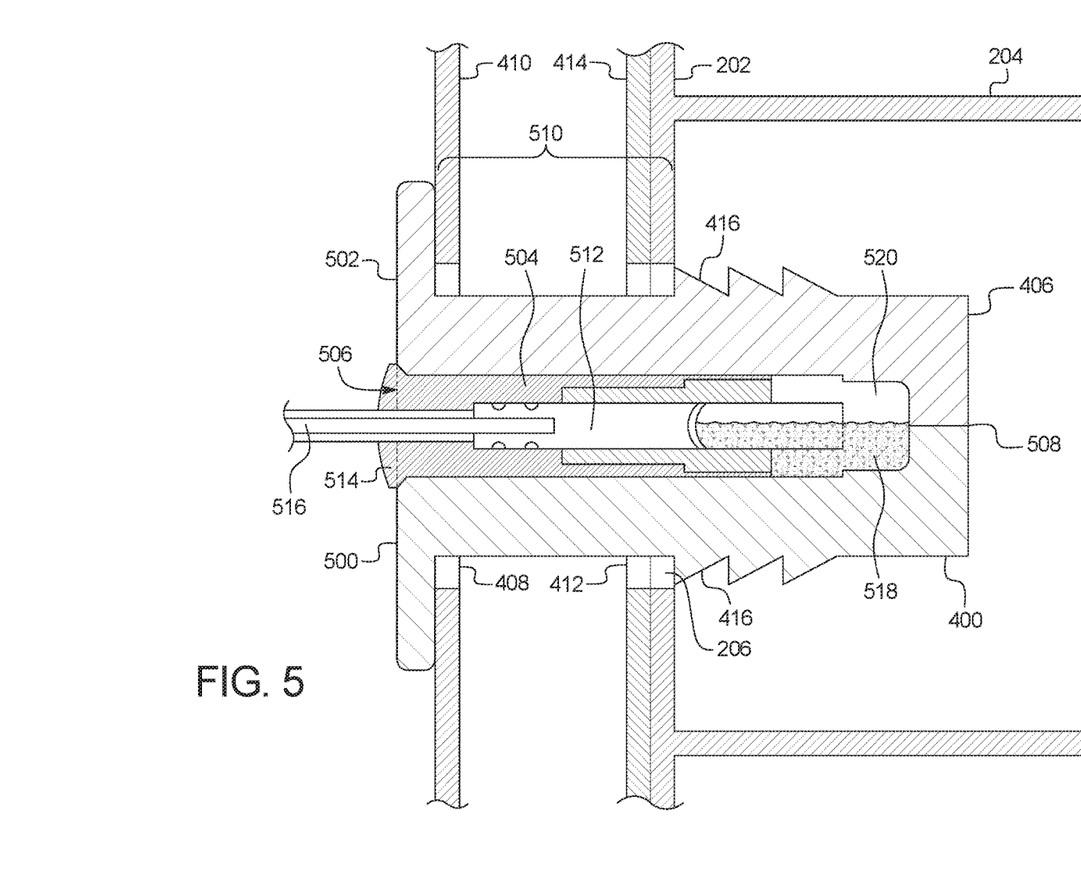
FIG. 5 illustrates a cross-section of a socket connector disposed within the body and hinge of the vehicle.

FIG. 5 illustrates a cross-section of the socket connector 400 disposed within the body 104 and hinge 200 of the vehicle 100. The socket connector 400 is configured to form a robust electrical connection to pin connector 404 of the tailgate 102. In the illustrated example, the socket connector 400 is on its side.

The socket connector 400 includes a body 500. In the illustrated example, the retention clips 416 are integrally formed from the body 500. Additionally, the body 500 includes a retention flange 502 integrally formed from the body 500. The body 500 defines a chamber 504 with a power lead opening 506. The body 500 also defines a split line 508 through the body 500 from the chamber 504 to the first end 406 of the socket connector 400. A locating feature 510 is defined on the body 500 between the retention flange 502 and the retention clips 416. The locating feature 510 is configured to accommodate a space between the inner skin 410 and the outer skin 414 of the body 104 of the vehicle 100 and the thickness of the base plate 202 of the hinge 200.

A hyperboloid socket 512 is disposed within the chamber 504 aligned with the split line 508. In the illustrated example, the socket 512 is a hyperboloid socket. In other example, the socket 512 may be any other suitable type of socket based on requirements for factors such as make-break connections, and/or insertion forces, etc. The hyperboloid socket 512 is secured into the chamber 504 by potting material 514 (e.g., silicone, epoxy, polypropylene, etc.). The hyperboloid socket 512 is attached (e.g., crimped, soldered, etc.) to a wire 516 that is connected to the power bus of the vehicle 100. The chamber 504 is partially filled with dielectric oil 518 (e.g., polydimethylsiloxane fluid, etc.). Additionally, the chamber 504 is also partially filled with air 520 to facilitate displacement of the dielectric oil 518 when a hyperboloid pin of the pin connector 404 is engaged with the hyperboloid socket 512. When the hyperboloid pin of the pin connector 404 is engaged with the hyperboloid socket 512 via the split line 508, the dielectric oil 518 may move into the socket portion of the hyperboloid socket 512.

Figure 6:
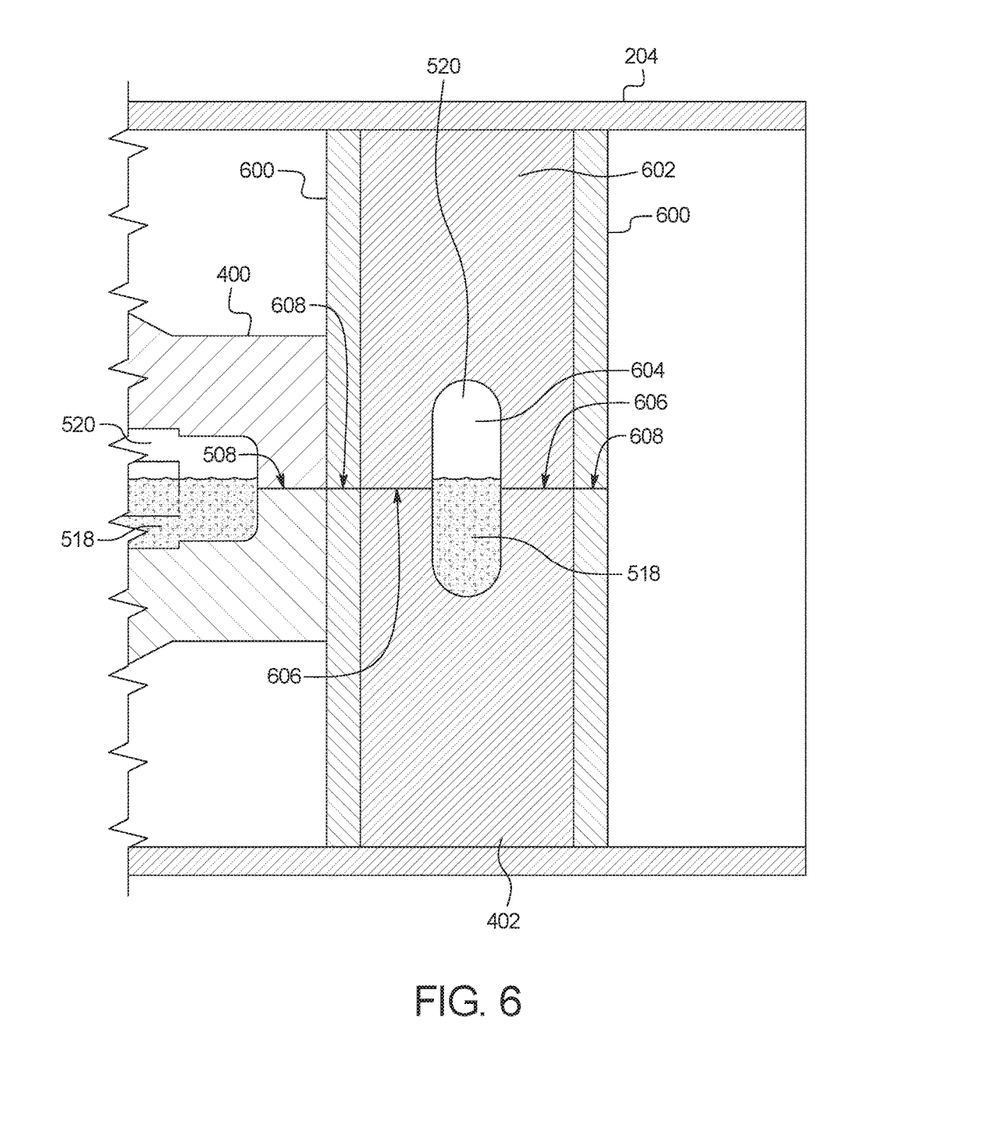
FIG. 6. illustrates a cross-section of a bushing within the hinge of the vehicle.

FIG. 6. illustrates a cross-section of the bushing 402 within the hinge 200 of the vehicle 100. The bushing 402 includes caps 600 and a body 602. The caps 600 and the body 602 are cylindrical and are configured to fit into the inner pivot body 204. In some examples, the caps 600 and the body 602 are sized to be secured into the inner pivot body 204 by friction so that the bushing 402 is removable and/or replaceable. In the illustrated example, the caps 600 are made of silicone rubber.

The body 602 defines a chamber 604 and a split line 606 from one of the caps 600 to the other one of the caps 600 through the chamber 604. The caps 600 define corresponding split lines 608. The split lines 606 and 608 are positioned so that the split lines 606 and 608 are coaxial with the split line 508 of the socket connector 400 when the bushing 402 is installed in the hinge 200. The chamber 604 is partially filled with dielectric oil 518. The viscosity of the dielectric oil 518 is greater than a capillary force of the split lines 606 and 608 and deters the dielectric oil 518 from leaking from the split lines 606 and 608. Additionally, the chamber 604 is also partially filled with air 520 to facilitate displacement of the dielectric oil 518 when a hyperboloid pin of the pin connector 404 penetrates through the bushing 402.

Figure 7:
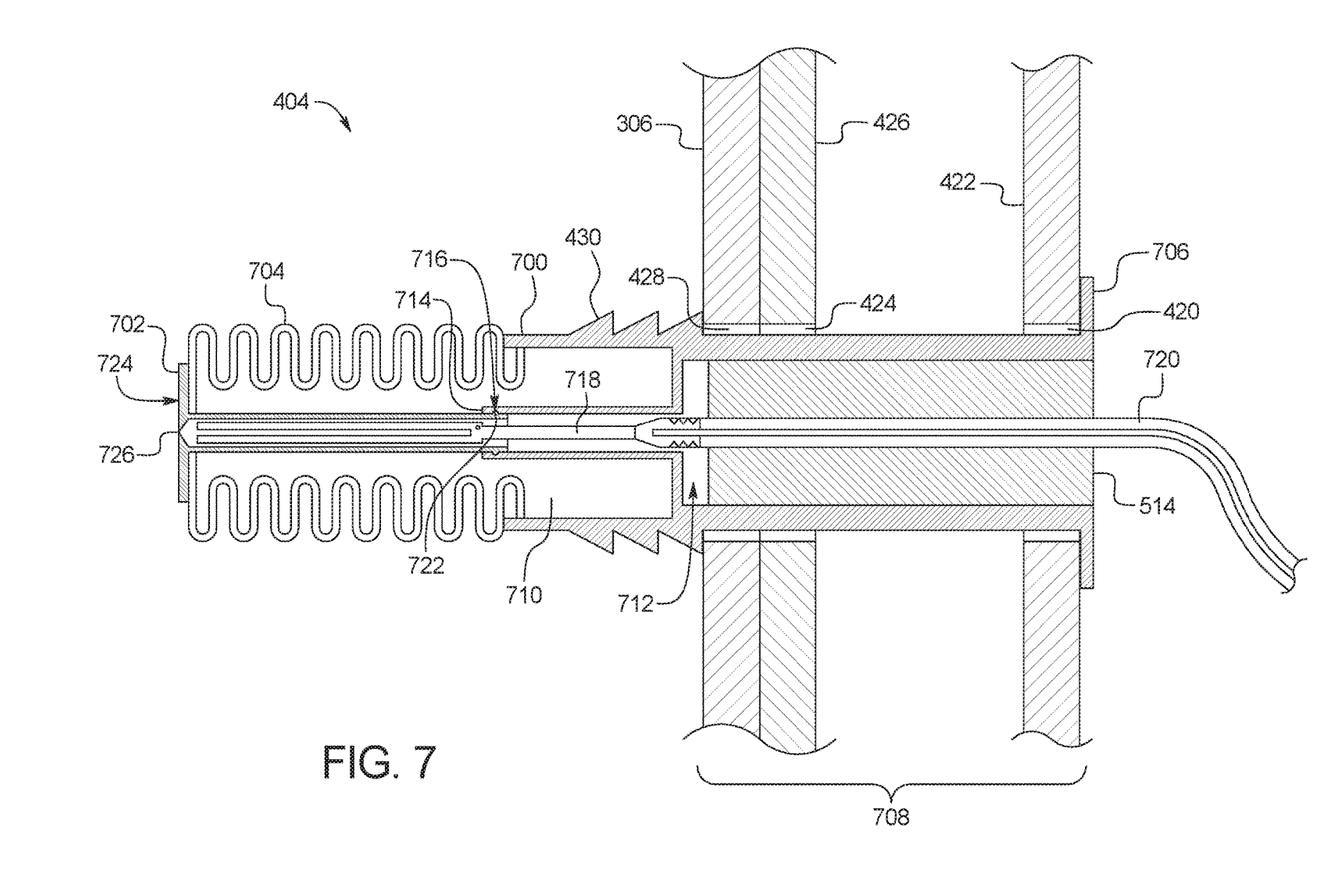
FIG. 7 illustrates a cross-section of a pin connector disposed within the tailgate.

FIG. 7 illustrates a cross-section of the pin connector 404 disposed within the tailgate 102. In the illustrated example, the pin connector 404 includes a body 700, a pin sheath 702, and a bellows 704. The body 700 of the pin connector 404 has a generally circular cross-section. The body 700 includes the retention clips 430 and a retention flange 706. Additionally, the body 700 defines a locating feature 708 between the retention clips 430 and the retention flange 706. The locating feature 708 is configured to accommodate a space between the inner skin 422 and the outer skin 426 of the tailgate 102 and the thickness of the outer pivot body 306.

The body 700 defines a cavity 710 and a chamber 712. A neck 714 of the body 700 extends through the cavity 710 and includes a portion of the chamber 712. The neck 714 defines a locking indentation 716. A hyperboloid pin 718 is disposed within the chamber 712. In the illustrated example, the pin 718 is a hyperboloid pin. In other example, the pin 718 may be any other suitable type of pin based on requirements for factors such as make-break connections, and/or insertion forces, etc. The hyperboloid pin 718 is attached (e.g., crimped, soldered, etc.) to a wire 720 that electrically couples the hyperboloid pin 718 to the electronics (e.g., the rear-view camera 114a, the sensors 114b, and/or the electrical outlet 114c, etc.) inside of the tailgate 102. The hyperboloid pin 718 and a portion of the wire 720 are held in the chamber 712 by potting material 514. The hyperboloid pin 718 extends beyond the neck 714 of the body 700.

The pin sheath 702 extends from the neck 714 of the body 700 and is partially disposed within the chamber 712. The pin sheath 702 protects the hyperboloid pin 718. In some examples, the pin sheath 702 is made of a non-conductive material, such as polypropylene (PP) or polyethylene (PE). The pin sheath 702 includes a locking ring 722. When the pin sheath 702 is extended (e.g., when the pin connector 404 is not engaged with the bushing 402 and/or the socket connector 400), the locking ring 722 engages with the locking indentation 716 in the neck 714 of the body 700 to deter the pin sheath 702 from being removed from the neck 714. On a face 724 of the pin sheath 702, the pin sheath 702 defines a split line 726 that facilitates the hyperboloid pin 718 passing through the pin sheath 702. The bellows 704 are compressible. In the illustrated example, when force is applied to the pin sheath 702, the pin sheath 702 moves farther into the chamber 712 and the bellows 704 compress. The bellows 704 protect the pin sheath 702. Additionally, the bellows 704 provide force to uncompress and push the pin sheath 702 to engage the locking indentation 716 of the neck 714 of the body 700 when the tailgate 102 is disengaged from the body 104 of the vehicle 100. In some examples, the bellows 704 is made of ethylene propylene diene monomer (EPMD) rubber.

Figure 8:
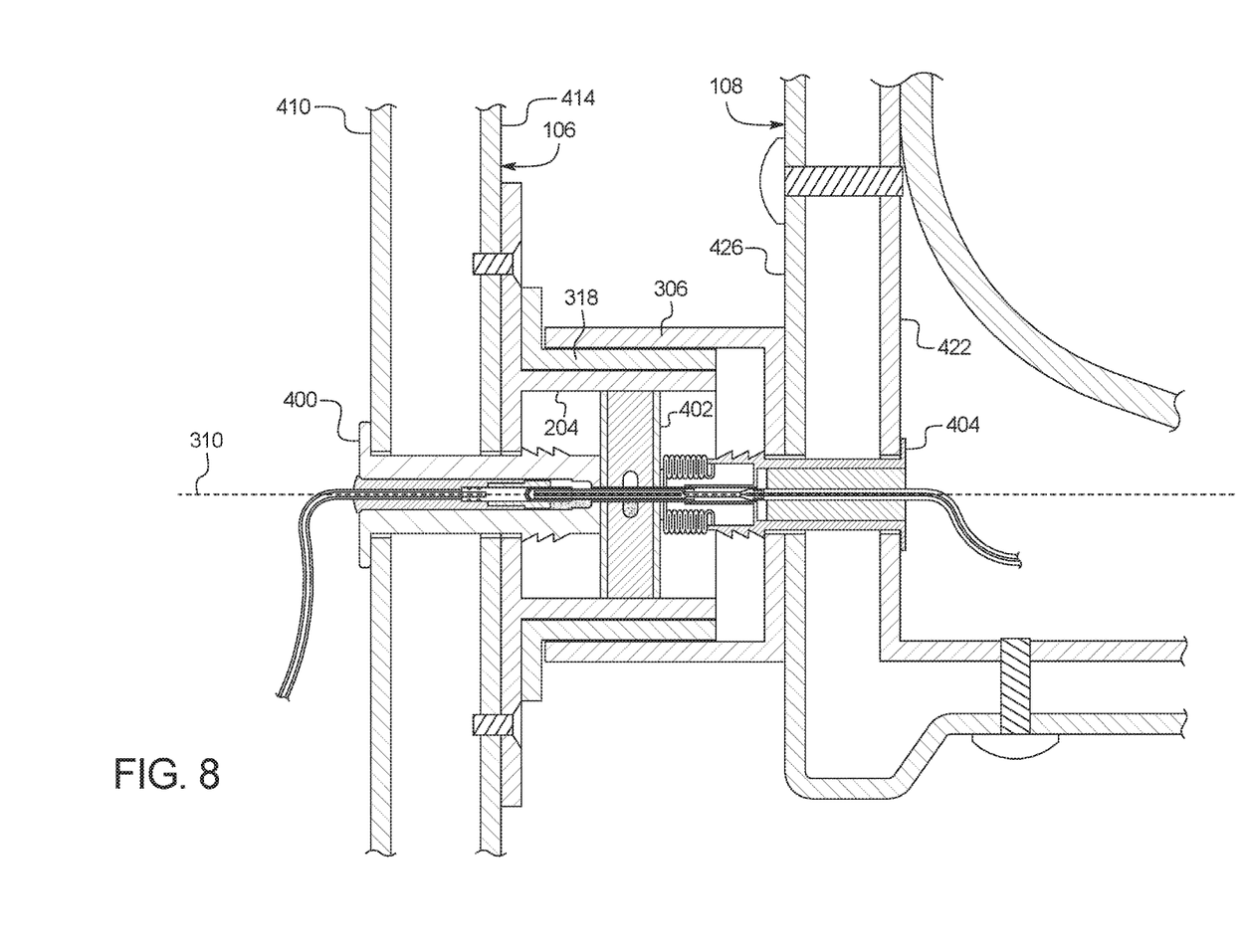
FIG. 8 is cross-section of the pin connector of FIG. 7 mated with the bushing of FIG. 6 and the socket connector of FIG. 5.

FIG. 8 is cross-section of the pin connector 404 of FIG. 7 mated with the bushing 403 of FIG. 6 and the socket connector 400 of FIG. 5. In the illustrated example, when the tailgate 102 is attached to the body 104 of the vehicle 100, the hyperboloid pin 718 of the pin connector 404 is coaxial (e.g., on the tailgate rotational axis 310) with the hyperboloid socket 512 of the socket connector 400. The outer pivot body 306 is disposed within the intermediate pivot body 318, which is disposed within the outer pivot body 306. The hyperboloid pin 718 of the pin connector 404 (a) penetrates the pin sheath 702 via the split line 726 of the pin sheath 702, (b) penetrates the bushing 402 via the split lines 606 and 608 of the bushing 402 (c) penetrates into the socket connector 400 via the split line 508 of the socket connector 400, and (d) engages with the hyperboloid socket 512 of the socket connector 400. Additionally, the bellows 704 of the pin connector 404 compress and the pin sheath 702 of the pin connector 404 slides farther into the neck 714 of the body 700 of the pin connector 404. The hyperboloid socket 512 is coated with the dielectric oil 518 as it passes through the bushing 402 and into the socket connector 400.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A bushing for a tailgate connector comprising:
   a first cap defining a first split line;
   a second cap defining a second split line;
   a cylindrical body between the first and second caps, the cylindrical body defining a chamber and a third split line, the third split line extending from the first cap to the second cap through the chamber, the third split line being coaxial with the first and second split lines to facilitate penetration of a connector pin through the bushing; and
   dielectric oil partially filling the chamber, the oil coating the connector pin as the connector pin passes through the chamber to provide corrosion resistance for the connector pin.

2. The bushing of claim 1, wherein the chamber is configured to contain a displaced portion of the dielectric oil when the connector pin penetrates through the third split line.

3. The bushing of claim 1, wherein the first and second caps are made of a first material, and the cylindrical body is made of a second material different than the first material.

4. The bushing of claim 3, wherein the first material is silicone and the second material is one of polypropylene or polyethylene.

5. The bushing of claim 1, wherein the first cap, the second cap and the cylindrical body are sized to fit within an inner pivot body of a socket connector.

6. The bushing of claim 5, wherein the first cap and the second cap are sized to be secured in the inner pivot body by a frictional force.

7. The bushing of claim 5, wherein the first and second end bodies are sized to be secured in the inner pivot body by a frictional force.

8. The bushing of claim 1, wherein a viscosity of the dielectric oil is greater than a capillary force of the first, second and third split lines such that the dielectric oil does not leak from the first, second and third split lines.

9. The bushing of claim 1, wherein the first, second, and third split lines deform to accept the connector pin, the connector pin having a greater diameter than the first, second, and third split lines.

10. The bushing of claim 1, wherein the chamber is partially filled with air.

11. A bushing for a tailgate connector comprising:
    a first and second end body;
    a cylindrical body between the first and second end body, the cylindrical body defining a chamber, the first end body, the second end body, and the cylindrical body defining a split line extending through the chamber; and
    dielectric oil partially filling the chamber, the dielectric oil having a viscosity and does not leak from the split lines because of a capillary force.

12. The bushing of claim 11, wherein the chamber is configured to contain a displaced portion of the dielectric oil when a connector pin penetrates through the split line.

13. The bushing of claim 11, wherein the first and second end bodies are made of a first material, and the cylindrical body is made of a second material different than the first material.

14. The bushing of claim 13, wherein the first material is silicone and the second material is one of polypropylene or polyethylene.

15. The bushing of claim 11, wherein the first end body, the second end body and the cylindrical body are sized to fit within an inner pivot body of a socket connector.

16. The bushing of claim 11, wherein the split line deforms to accept a connector pin, the connector pin having a greater diameter than the split line.

17. The bushing of claim 11, wherein the chamber is partially filled with air.

\* \* \* \* \*